(12) United States Patent
Sasaki

(10) Patent No.: US 7,761,315 B1
(45) Date of Patent: Jul. 20, 2010

(54) CUSTOMER-PARTICIPATING TYPE PRODUCTION/SUPPLY SYSTEM OPERATING APPARATUS

(76) Inventor: Beji Sasaki, 3-34-6, Yusbian, Bankyo-ku, Tokyo 113-0034 (JP)

( * ) Notice: Subject to any disclaimer, the term of this patent is extended or adjusted under 35 U.S.C. 154(b) by 1736 days.

(21) Appl. No.: 10/333,861

(22) PCT Filed: Jul. 28, 2000

(86) PCT No.: PCT/JP00/05115

§ 371 (c)(1),
(2), (4) Date: Jan. 24, 2003

(87) PCT Pub. No.: WO02/10999

PCT Pub. Date: Feb. 7, 2002

(51) Int. Cl.
*G06Q 10/00* (2006.01)

(52) U.S. Cl. .......................................................... 705/7
(58) Field of Classification Search ..................... 705/7, 705/10
See application file for complete search history.

(56) References Cited

U.S. PATENT DOCUMENTS

| | | | |
|---|---|---|---|
| 5,710,887 A | 1/1998 | Chelliah et al. | |
| 5,915,243 A | 6/1999 | Smolen | |
| 5,923,016 A * | 7/1999 | Fredregill et al. | ............ 235/380 |
| 5,937,391 A | 8/1999 | Ikeda et al. | |
| 5,983,196 A | 11/1999 | Wendkos | |
| 6,889,198 B2 * | 5/2005 | Kawan | ......................... 705/14 |

FOREIGN PATENT DOCUMENTS

| | | |
|---|---|---|
| EP | 0 950 970 A2 | 10/1999 |
| JP | 10-078989 A1 | 3/1998 |
| JP | 11-039405 A | 2/1999 |
| JP | 11-288427 A1 | 10/1999 |
| JP | 11-296587 A1 | 10/1999 |
| JP | 2000-132619 A1 | 5/2000 |
| WO | WO-00/31664 | 6/2000 |

OTHER PUBLICATIONS

"HDPE shortage thwarts Xerox recycling plan", Jun. 1995, Plastics News, p. 1, Dialog 03898356 45615387.*

(Continued)

*Primary Examiner*—Jonathan G Sterrett
(74) *Attorney, Agent, or Firm*—Cheng Law Group, PLLC

(57) ABSTRACT

According to the present invention, there is provided a customer-participating type production/supply system operating apparatus to be used in the production/supply activities, which are made premising the purchasing activities: that a customer offers a cooperation for reducing the production/supply cost of a supplier on the basis of the information aimed at customers on the cooperation request of the supplier, as acquired through the media such as magazines, newspapers, direct mails or internet for reducing all the production/supply cost containing the manufacture cost/the purchasing cost/the general managing cost/the estimated risk in the production/supply system of the supplier; and that the supplier examines and accepts the offer so that, at the time of the consuming activities of the customer to be made with the return of a portion or all of the fruits of the reduction of the production/supply cost, the customer can utilize the return benefits acquired not only from the partner, from whom the customer purchases the product, but also from a plurality of other suppliers.

26 Claims, 10 Drawing Sheets

OTHER PUBLICATIONS

Marien, Edward J, "Reverse Logistics as Competitive Strategy", copyright 1998, Supply Chain Management Review, pp. 1-14.*

"Modified FMEA Using Analysis of Automotive Remanufacturer Waste Streams to Support Design for Remanufacture" M Sherwood, LH Shu—Proceedings of the ASME DETC: CIE, 2000.*

Third Canadian Office Action for the Application No. 2,417,588 from the Canadian Intellectual Property Office dated Jun. 20, 2006.

Fourth Canadian Office Action for the Application No. 2,417,588 from the Canadian Intellectual Property Office dated Dec. 3, 2008.

Canadian Patent Office Action for Application No. 2,417,588 dated Feb. 4, 2005.

Canadian Patent Office Action for Application No. 2,417,588 dated Oct. 18, 2005.

International Search Report of PCT/JP00/05115 mailed on Oct. 31, 2000.

International Preliminary Examination Report of PCT/JP00/05115 completed on Aug. 26, 2002.

Taiwan Patent Office Examination Report dated Oct. 28, 2003.

English Translation of International Preliminary Examination Report of application PCT/JP00/05115 dated Aug. 26, 2002.

Taiwanese Patent Office Action for the Application No. 89115297 mailed on Jun. 6, 2005.

* cited by examiner

Fig.4

1-I    Cooperation Request Item of D from the Supplier b to the Customer a and Return Benefit Point

| Cooperation Requesting Supplier Code | Supplier Name | Item Code | Item | Return Benefit Point |
|---|---|---|---|---|
| b-0001 | Maeda Tobacco Store | b-0001-0001 | Advance order of regular purchase | 1,000 |
| | | b-0001-0002 | Affirmation of regular purchase (10 boxes and over per month) | 5,000 |
| | | b-0001-0003 | Affirmation of regular purchase (10 boxes and over per month / Acceptance of automatic transfer) | 7,000 |
| | | b-0001-0004 | Affirmation of regular purchase (20 boxes and over per day) | 10,000 |
| | | b-0001-0005 | Affirmation of regular purchase (20 boxes and over per day / Acceptance of automatic transfer) | 12,000 |
| b-0002 | Miyauchi Kohmuten | b-0002-0001 | Enrollment of free study class of wooden house | 10,000 |
| | | b-0002-0002 | Enrollment of pay study class of wooden house | 30,000 |
| b-0003 | Sekiguchi Saketen | b-0003-0001 | Selling sake by measure (bring a tare and order 3 gou in advance everyday) | 10,000 |
| | | b-0003-0002 | Selling sake by measure (bring a tare and order 3 gou in advance everyday / Acceptance of automatic transfer) | 12,000 |
| | | b-0003-0003 | Cooperation recycling of beer bottle (Affirm to purchase 10 bottles and over per month in advance) | 5,000 |
| | | b-0003-0004 | Cooperation recycling of beer bottle (Affirm to purchase 10 bottles and over per month in advance / Acceptance of automatic transfer) | 7,000 |
| b-0004 | Net Bank | b-0004-0001 | Card member (Become a free member) | 8,000 |
| | | b-0004-0002 | Card member (Become a paid member) | 30,000 |
| | | b-0004-0003 | Acceptance of opening an account for automatic transfer of public utility fees | 10,000 |
| | | b-0004-0004 | Acceptance of opening an accout for transsffering of payment | 10,000 |

Fig.5

1-II  Prices and Specifications of Supply Products

| Supplier Code | Supplier Name | Product Code | Product | Specification | Price | Point |
|---|---|---|---|---|---|---|
| c-0001 | Nishishiba | c-0001-01 | Flat wide TV | 32 inches | ¥170,000 | 170,000 |
| | | c-0001-02 | Air Cleaner | HEPA Filter/21Tatamis | ¥35,000 | 35,000 |
| | | c-0001-03 | Notebook Computer | Dynabook | ¥200,000 | 200,000 |
| | | c-0001-04 | DVD Player | | ¥88,000 | 88,000 |
| c-0002 | Funaki | c-0002-01 | VCR | G-code/HIFI | ¥15,000 | 15,000 |
| | | c-0002-02 | Air Conditioner | DC Inverter | ¥98,000 | 98,000 |
| | | c-0002-03 | TV with built-in VCR | 20 inches | ¥52,000 | 52,000 |
| c-0003 | Freesia | c-0003-01 | Desktop bookbinder | Hot-melt method | ¥19,800 | 19,800 |
| c-0004 | Nippon Tourist | c-0004-01 | Round trip air ticket of Tokyo - Sydney | Book before 90 days | ¥65,000 | 65,000 |
| | | c-0004-02 | Package ticket of travel to Korea for 2 nights | Air ticket +accommodation | ¥20,000 | 20,000 |
| c-0005 | Olympasso | c-0005-01 | Digital camera | 3 million PIXEL | ¥60,000 | 60,000 |

(In case of: 1 point = 1 Yen)

Fig.6

Examination standard data of subscription for cooperation request

Cooperation requesting supplier code : b-0002
Cooperation requesting supplier name : Miyauchi Kohmuten
Cooperation request item code : b-0002-0001
Cooperation request item name : Enrollment of free study class of wooden house
Return benefit points : 10,000 points

| Question items | Alternatives |
|---|---|
| 1. Do you have a schedule to build a house newly or reform it within ten years? | a. YES   b. NO |
| 2. Age | a. under 20   b. 20's   c. 30's   d. 40's   e. over 50 |
| 3. Married/Unmarried | a. married   b. unmarried |
| 4. Number of children | a. 0   b. 1   c. 2   d. more than 2 |
| 5. Annual income | a. less than 6 million yen<br>b. 6~8million yen   c. 8~10 million yen<br>d. 10~15 million yen<br>e. over 15 million yen |
| 6. Kind of credit cards you have | a. AMEX   b. VISA/MASTER   c. DINERS   d. JCB |
| 7. Residence | a. owned house   b. condominium   c. rent   d. others |
| 8. Residential years | a. less than 5   b. 5~10   c. 10~15   d. more than 15 |
| 9. What cooperation can you give as your house is built? | a. Adjust construction schedule 3 houses together in the same area.<br>b. Approve of settlement of construction schedule ahead in 6 month unit.<br>c. Visit company when a meeting is held.<br>d. Cooperate positively in application, neighborliness care and etc. |

------------------------------------------------------------------

Return benefit point giving standard
1=a., and 2=except a., and 3=a., and 5=b., and 6>0, and 9>0

Fig. 6 (Cont)

1=a., and 2=except a., and 3=a., and 5=b., and 6>0, and 9>0

| | |
|---|---|
| Cooperation requesting supplier code | : b-0001 |
| Cooperation requesting supplier name | : Maeda Tobacco Store |
| Cooperation request item code | : b-0001-0001 |
| Cooperation request item name | : Advance order of regular purchases |
| Return benefit points | : 1,000 points |

| Question Item | Alternatives |
|---|---|
| 1. Address | (input prefecture) |
| 2. Age | a. under 20   b. 20's   c. 30's   d. 40's<br>e. over 50 |
| 3. Average numbers of cigarette smoke in one day. | (input the number of cigarettes) |
| 4. Brand | a. domestic   b. U.S. made   c. others<br>d. not fixed |
| 5. Where do you buy cigarettes? | a. near house   b. near office   c. others<br>d. not fixed |
| 6. How many cartons do you buy in one month? | (input the number of cartons) |
| 7. How many years since you have started smoke cigarette? | (input the number of years) |
| 8. Do you plan to quit smoking? | a. YES   b. NO |
| 9. Home delivery and automatic transfer are allowed? | a. YES   b. NO |

Return benefit point giving standard
(2 = except a) and (4 number of cigarettes>10) and (8 = b)

Fig.7

1-III Subscription for Cooperation of D from the Customer a / Propriety of Examination Result Data (イ) Storage Means for Storing the Data of Transfer / Settlement of the Authenticated Return Benefit Point

| Subscription Date | Customer Code | Customer Name | Cooperation Requesting Supplier Code | Cooperation Requesting Supplier Name | Item Code | Item Name | Return Points |
|---|---|---|---|---|---|---|---|
| H12.4.20 | a-0004 | Sinzo Suzuki | b-0001 | Maeda Tobacco Store | b-0001-0004 | Regular Purchase (to affirm 20 boxes and over per month) | 10,000 |
| H12.4.20 | a-0005 | Taro Sasaki | b-0002 | Miyauchi Kohmuten | b-0002-0002 | Enrollment of pay study class of wooden house | 30,000 |
| H12.4.20 | a-0006 | Kohachi Sonoda | b-0003 | Sekiguchi Saketen | b-0003-0001 | Selling Sake by measure (bring a tare and order 3 gou in advance everyday) | 10,000 |
| H12.4.25 | a-0005 | Taro Sasaki | b-0004 | Net Bank | b-0004-0002 | Card member (become a paid member) | 30,000 |
| H12.4.25 | a-0007 | Junkichi Saito | b-0004 | Net Bank | b-0004-0003 | Accept to open an account for automatic transfer of public utility fees | 10,000 |
| H12.5.13 | a-0007 | Junkichi Saito | b-0004 | Net Bank | b-0004-0004 | Accept to open an account for transition of payment | 10,000 |

| Notice Date | Authentication Date | Authentication Code | Transfer Date | Transfer Code | Settlement Date | Settlement Code |
|---|---|---|---|---|---|---|
| H12.4.20 | | | | | | |
| H12.4.21 | H12.4.21 | ab-0005-0002-0001 | H12.5.15 | ħab-0002-001 | H12.5.20 | ħabc-0002-001 |
| H12.4.21 | H12.4.21 | ab-0006-0003-0001 | H12.6.2 | ħab-0003-001 | | |
| H12.4.25 | H12.5.10 | ab-0005-0004-0001 | H12.5.15 | ħab-0004-001 | H12.5.20 | ħabc-0004-001 |
| H12.4.25 | H12.4.26 | ab-0007-0004-0001 | H12.6.9 | ħab-0004-002 | H12.6.10 | ħabc-0004-002 |
| H12.5.13 | H12.5.25 | ab-0007-0004-0002 | H12.6.9 | ħab-0004-003 | H12.6.10 | ħabc-0004-003 |

To be inputted on the basis of the subscription reception at the center from the customer to the cooperation requesting supplier or subscribed through the networks by the customer inputting themselves

Fig.8

(ロ) Whole Ordering/Receiving Process Specifying Data

| Ordering/Receiving Code | Reception Date | Customer Code | Customer Name | Supplier Code | Supplier Name | Product Code | Product Name | Reception Number | Supply Sum |
|---|---|---|---|---|---|---|---|---|---|
| カa-0005-001 | H12.5.15 | a-0005 | Taro Sasaki | c-0001 | Nishishiba | c-0001-03 | Notebook Computer | 1 | ¥200,000 |
| カa-0006-001 | H12.6.2 | a-0006 | Kohachi Sonoda | c-0002 | Funaki | c-0002-01 | VCR | 1 | ¥15,000 |
| カa-0007-001 | H12.6.9 | a-0007 | Junkichi Saito | c-0004 | Nippon Tourist | c-0004-02 | Travel ticket to Korea | 1 | ¥20,000 |

| Authentication Code | Transfer Point Number | Transfer Date | Transfer Code | Balance (Collected Amount from Customer) | CollectionDate (Dispatch Instructing Date) | Dispatch Propriety | Dispatch Date (Settlement day) | Settlement Code |
|---|---|---|---|---|---|---|---|---|
| ab-0005-0002-0001 | 30,000 | H12.5.15 | カab-0002-001 | -140,000 | H12.5.18 | OK | H12.5.20 | カabc-0002-001 |
| ab-0005-0004-0001 | 30,000 | H12.5.15 | カab-0004-001 | | | | | カabc-0004-001 |
| Amount: | 60,000 | | | | | | | |
| ab-0006-0003-0001 | 10,000 | H12.6.2 | カab-0003-001 | -5,000 | | | | |
| Amount: | 10,000 | | | | | | | |
| ab-0007-0004-0001 | 10,000 | H12.6.9 | カab-0004-002 | 0 | H12.6.9 | OK | H12.6.10 | カabc-0004-002 |
| ab-0007-0004-0002 | 10,000 | H12.6.9 | カab-0004-003 | | | | | カabc-0004-003 |
| Amount: | 20,000 | | | | | | | |

Fig.9

(八) Account Collations of the Return Benefit Point Number and the Account Data

| Settlement Code | Settlement Point Number | Settlement Date | Supplier Code | Supplier Name | Transfer Code | Transfer Point Number | Transfer Date | Customer Code |
|---|---|---|---|---|---|---|---|---|
| ﾊabc-0002-001 | 30,000 | H12.5.20 | c-0001 | Nishishiba | ﾊab-0002-001 | 30,000 | H12.5.15 | a-0005 |
| ﾊabc-0004-001 | 30,000 | H12.5.20 | c-0001 | Nishishiba | ﾊab-0004-001 | 30,000 | H12.5.15 | a-0005 |
| ﾊabc-0004-002 | 10,000 | H12.6.10 | c-0004 | Nippon Tourist | ﾊab-0003-001 | 10,000 | H12.6.2 | a-0006 |
| ﾊabc-0004-003 | 10,000 | H12.6.10 | c-0004 | Nippon Tourist | ﾊab-0004-002 | 10,000 | H12.6.9 | a-0007 |
| | | | | | ﾊab-0004-003 | 10,000 | H12.6.9 | a-0007 |

| Sum of Settled Point Number | 80,000 | Authenticated Point of Unsettled Balance | 10,000 | Total Transferred Point Number | 90,000 | Transferred Point of Unsettled Balance | |

| Customer Name | Authentication Code | Authentication Point Number | Authentication Date | Cooperation Requesting Supplier Code | Cooperation Requesting Supplier Name |
|---|---|---|---|---|---|
| Taro Sasaki | ab-0005-0002-0001 | 30,000 | H12.4.21 | b-0002 | Miyauchi Kohmuten |
| Taro Sasaki | ab-0006-0003-0001 | 10,000 | H12.4.21 | b-0003 | Sekiguchi Saketen |
| Kohachi Sonoda | ab-0005-0004-0001 | 30,000 | H12.5.10 | b-0004 | Net Bank |
| Junkichi Saito | ab-0007-0005-0001 | 10,000 | H12.4.26 | b-0004 | Net Bank |
| | ab-0007-0005-0002 | 10,000 | H12.5.13 | b-0004 | Net Bank |

| 10,000 | Total Authenticated Point Number | 90,000 | Authentication Point of Untransfered Balance | 0 |

CUSTOMER-PARTICIPATING TYPE PRODUCTION/SUPPLY SYSTEM OPERATING APPARATUS

FIELD OF THE INVENTION

The present invention realizes the reduction. (or the cost reduction) of all the production/supply costs that contain the manufacture cost/the purchasing cost/the general management cost/the estimated risk in the production/supply system of a supplier, by asking the powers of a number of customers, so that a customer is enabled to develop his consuming activities by entering the opened production/supply system in the supplier. Moreover, the present invention relates to the customer-participating type production/supply system operating apparatus which develops the technique capable of exhibiting the partnerships, as could not be efficiently operated before the development of the IT technology, between numerous customers and enterprises, so that the economic efficiency of the general society is promoted to spare the man/substance (resources)/money thereby to contribute to a harmonic development.

DESCRIPTION OF THE RELATED ART

The existing market is a one-sided production/supply system of a supplier leading type. Specifically, the supplier provides specific commodities and services, and the customer purchases the specific commodities and services provided. In this system, the kinds/prices/qualities of the commodities and services provided are wholly decided by the judgment on the supplier side, and the need and will of the customer are highly respected by marketing them, but their decisions have no room for direct entry of the will of the customer. On the other hand, the supplier has to pay extraordinarily from the aspect of cost, if he consumes such time and labor individually for the numerous customers, and this payment is impossible as a matter of fact. Therefore, the only thing the customer finally can do is to make a selection from the commodities and services, as provided by the judgment of the supplier with specific kinds/prices/qualities, and to purchase the commodities and services.

In the unilateral production/supply system (in which the estimated risks or the like for maintaining the kinds, the specifications, the prices, the qualities and the system itself are decided only by the judgment of the supplier) of the supplier leading type of the prior art, however, a specific commodity or service provided by the supplier may become comparatively expensive for the estimated risk, may invite deterioration in the quality/service, or may hold the excessive production (or dead stock). Therefore, all the commodities or services provided are not accepted by the customer. In other words, the customer does not purchase the commodity or service provided by the supplier, if he is not satisfied with it after he examined the kind/price/quality of the commodity and service provided.

As a result, the products, for which the money/labor/time consumed by the supplier for providing the commodity and service are wholly useless, must be contained at a predetermined ratio. With predicting such situation, the supplier may set the provided commodity and service at a higher price or may deteriorate the quality or service. In this case, the customer less purchases the provided commodity and service, and the supplier consumes the more cost for selling them. Not only this vicious cycle is caused by the existing production/supply system, but also the man/money/resources are consumed uselessly in the general economic society.

If the opinions of the customer were introduced in advance into the contents and the production amounts of the commodity and service provided by the supplier and if the supplier exposed his weak points, as viewed from the rational viewpoints of his own, production/supply system but could get the cooperation and help of the customer for the weak points, the marketing and production planning could be drastically higher in precision than those of the existing situation. Then, the commodity and service of better contents could be obtained with the production planning of less deviation, and moreover with stable operations and a drastic reduction of the working expenses, so that the commodity and service could be supplied at lower prices than the prevailing ones.

Therefore, the present invention has an object to provide a customer-participating type production/supply system operating apparatus, which remakes the existing unilateral production/supply system of the supplier leading type into such an opened production/supply system that the customer can positively participate thereinto to cooperate to reduce the production/supply cost (or the cost reduction) for every detailed items, to establish more planned and rationalized efficient production/supply system (wherein the uselessness and irregularity of the man/substance/money are reduced by the cooperation with the customer) which realizes sparing of the resources, thereby to lower all the production/supply costs so that a portion of, or all of the reduction realized thereby may be returned to the customer in compensation for the cooperation of each item to give developing continuous merits to both the supplier and the customer.

According to the present invention, there is provided a computer apparatus for operating a production or supply system in which customers can participate, the computer apparatus comprising:

first storage means storing data relating to a cooperation request item for a supplier and return benefit points associated with the cooperation request item;

second storage means storing data relating to specifications and the price of a product supplied by the supplier, as data associated with the supplier;

third storage means storing subscription data input by a customer to the computer apparatus when the cooperation request item is subscribed to by the customer, as data associated with a customer code of the customer;

fourth storage means storing the return benefit points determined according to the subscription data stored by the third storing means, as data associated with the customer code;

fifth storage means for storing order data placed by the customer when the product supplied by the supplier is purchased by the customer;

sixth storage means storing balance data of the return benefit points for each customer code and being able to be used by the each customer;

first processing means implemented by software for checking the subscription data stored in the third storing means when the cooperation request item is subscribed to by the customer and determining if the subscription data meets the supplier's requirements to authenticate the customer code for the customer;

second processing means implemented by software for retrieving and determining the return benefit points stored in the first storage means according to the order data placed by the customer having the customer code authenticated by the first processing means and the data relating to the product stored in the second storage means, and adding the determined return benefit points to the balance data of the customer code of the customer placing the order data or subtracting the determined return benefit points from the balance data of the customer code of the customer placing the order data; and control means for controlling the first to sixth storage means, the first processing means, and the second processing means.

In the customer-participating type production/supply system operating apparatus according to the present invention, the supplier invites cooperative customers for the supplier widely by explicitly presenting the specifications and price of the product containing all the hardware/software/services to be supplied at present and in the future, the specific items requesting the cooperation for reducing (or the cost reduction) of all the production/supply costs containing the manufacture cost/the purchasing cost/the general management cost/the estimated risk in the production/supply system of the supplier, and the return benefit points in compensation for those items.

On the basis of the information given from the aforementioned numerous suppliers, moreover, the customer selects the product he wants to purchase at present or in the future, or the supplier having the product group in accordance with his own desire, and examines every items explicitly presented, to cooperate for reducing (or the cost reduction) of the production/supply cost.

As a result, the merits of both the customer and the supplier can be achieved at the same time by acquiring the merit of the customer himself through the return benefits to come to hand and by contributing to the reduction (or the cost reduction) of the production/supply cost of the supplier on the other hand.

In order not to terminate the relation between the customer and the supplier by one pair but to apply it widely between the numerous customers and the numerous suppliers, moreover, the supplier gives the return benefits positively before the execution of the cooperation, if this future cooperation of the customer is promised for reducing (or the cost reduction) of the production/supply cost of the supplier.

As a result, the customer can use the return benefits even in the acquisition of the products of any suppliers so that the range of the exploitation of the return benefits can be widened to stimulate the aggregate demand thereby to lead to the result to receive the benefits of all the suppliers.

In short, it is possible to provide the customer-participating type production/supply system operating apparatus which is enabled, by causing the sum of the return benefits obtained by the promise of the cooperation with the numerous suppliers A, B and C to be used for acquiring the product of one supplier called D, to realize the multiplier effect with expanding the selection of the customer thereby to respond to all participants of both the customers and the suppliers.

Moreover, the aforementioned problems are likewise solved such that there are a plurality of suppliers for returning the return benefit points in compensation of the reduction of the production/supply cost to the customer.

Moreover, the aforementioned problems are likewise solved such that the customer can use the return benefit points in compensation for the reduction of the production/supply cost of a specific supplier, in another supplier.

In addition, the aforementioned problems are likewise solved by comprising: a computer terminal for inputting the information on the supplier side; a computer terminal for inputting the information on the customer side; and a host computer for managing those pieces of information through communication lines.

BRIEF DESCRIPTION OF THE DRAWINGS

FIG. 4 is an explanatory diagram showing specific examples of the cooperation request items from the supplier to the customer for reducing (or the cost reduction) of the production/supply cost and the return benefit point information.

FIG. 5 is an explanatory diagram showing specific examples of the product information to be supplied by the supplier.

FIG. 6 is an explanatory diagram showing specific examples of examination standard data for a subscription to the cooperation request for reducing (or the cost reduction) of the production/supply cost.

FIG. 7 is an explanatory diagram showing specific examples of the subscription/authentication/transfer/settlement process data to the cooperation requests for reducing (or the cost reduction) of the production/supply cost.

FIG. 8 is an explanatory diagram showing specific examples of the whole ordering process specifying data.

FIG. 9 is an explanatory diagram showing specific examples of the balance collation and the balance data of the return benefit point numbers.

DESIGNATIONS OF REFERENCE NUMERALS

Figure 1:
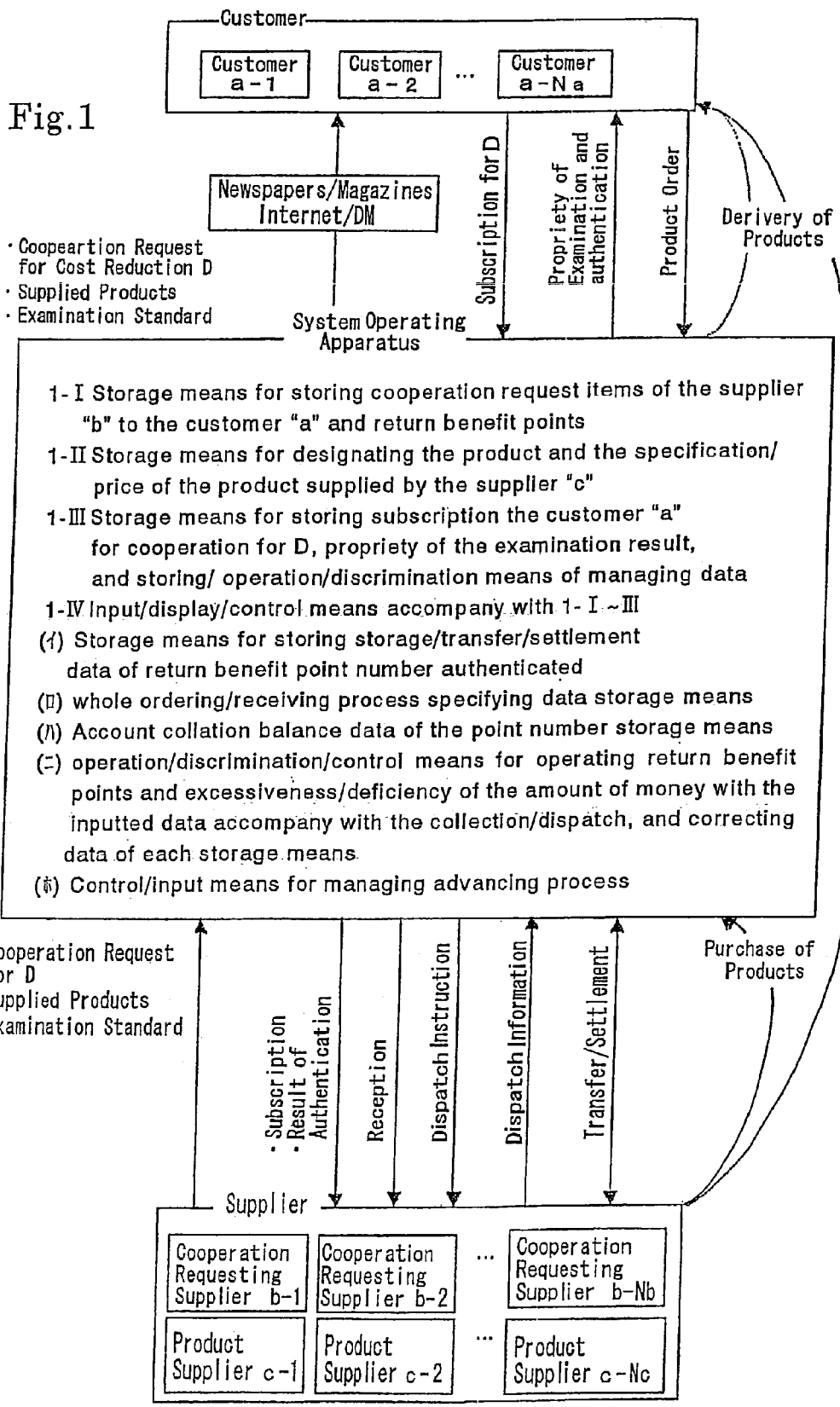
FIG. 1 is a schematic diagram showing the relations between a customer and a supplier and the flow of a product when a customer-participating type production/supply system operating apparatus according to the present invention is used.

Reference numeral 10 designates cooperation request item/return benefit point information storing means
Reference numeral 11 designates supply product information storing means
Reference numeral 12 designates subscription/examination result/propriety data storing means
Reference numeral 13 designates storage/transfer/settlement data storing means
Reference numeral 14 designates whole ordering/receiving process specifying data storing means
Reference numeral 15 designates account collation/balance data storing means
Reference numeral 16 designates return benefit point operating means
Reference numeral 17 designates examination result propriety discriminating means
Reference numeral 18 designates control means
Reference numerals 19, 19A designate input means
Reference numerals 20, 20A designate output means
Reference numerals 21, 21A designate printing means

DESCRIPTION OF THE PREFERRED EMBODIMENTS

According to the present invention, as has been described hereinbefore, on the basis of the information given from numerous suppliers, a customer selects the product he wants to purchase at present or in the future, or a supplier having the product group in accordance with his own desire, and cooperates for reducing (or the cost reduction) the production/supply cost, so that the merits of both the customer and the supplier can be achieved at the same time by acquiring the merit of the customer himself through the return benefits to come to hand and by contributing to the reduction (or the cost reduction) of the production/supply cost of the supplier.

First of all, here will be described the contents of the reduction (or cost reduction) of the cost for production and supply of a supplier, as centralize the present invention.

If the sales of a supplier are assumed to be a factor A, generally, the sales A=the cost (or production cost+the supply cost)+the profit. If the cost is designated by B and if the profit is designated by C, moreover, the sales A=the cost B+the profit C.

In the view from the customer, the sales A of the supplier can be deemed as the sum of the payments of multiple customers, so that the customer's total payment A=the supplies sales A=the supplier's cost B+the profit C.

Here, a factor D is assumed to be the cost reduction sum, for which the supplier and the customers have cooperated to achieve the reduction (as will be called the cost reduction) of all the production/supply costs that contain the manufacture cost/the purchasing cost/the general management cost/the estimated risk in the production/supply system of the supplier. Then, the supplier's sales A=the cost B'+the profit C+the cost reduction sum D. On the other hand, the total A of the customer's payments=the supplier's cost B'+the profit C+the cost reduction sum D.

Premising that the supplier returns the price reduction sum D by an X % to the customers, moreover, the supplier's sales A'=the sales A−the cost reduction sum D×X/100=the supplier's cost B'+the profit C+(1−X/100)×the cost reduction sum D. Another change is the sum A' of the customer's payments=the total payment A−the cost reduction sum D×X/100=the supplier's cost B'+the profit C+(1−X/100)×the cost reduction sum D. Here, (1−X/100)×D is an additional factor of C.

As a result, in the supplier, the profit C'=the conventional profit C+(1−X/100)×D≧the conventional profit. Moreover, the enterprise's competitive power>the conventional competitive power.

In the customer, on the other hand, the total payment A'=the conventional total payment A−X/100×D<the conventional total payment.

In addition, the time axis is caused to act on the aforementioned formulas. For the cost reduction sum D to be realized in the future by the cooperation of the customer and the supplier, the supplier returns the D return sum (D×X %) considering a constant risk to the customer at the present before the execution of its purchasing activities. The customer receives the cost reduction sum (D×X %) in the future from the multiple suppliers and executes the present product purchasing activities with that total sum. Then, the following fruits can be added.

Specifically, a phenomenon of the total of the cost reduction sums D received by the customer≧the payment sum A can occur at present although temporarily.

In other words, the customer is enabled at present to purchase a product with no pay or acquire an income higher than the price of the purchased product by causing the supplier to secure the items of cooperation with the supply activities in the future consumption activities. For the sum of no purchase, alternatively, the returned portion of the cost reduction sum D is wholly the income of the customer.

The cost reduction is defined herein the fact that the reduction in all the production/supply costs including the production cost/the purchasing cost/the general management cost/the estimated cost in the production/supply system of the supplier can be achieved by the mutual cooperation between the supplier and the numerous customers so that the price of the product can be made lower than the conventional price. On the other hand, the cost reduction sum expresses such a fruit in the amount of money as is borne by the cooperation of the supplier and the customers.

As described above, a customer-participating type production/supply system operating apparatus can be constructed to establish the marketing method and the production supply cost reducing method which have been impossible in the prior art.

FIG. 1 presents an example of the whole construction of the customer-participating type production/supply system operating apparatus according to the present invention. Here are a plurality of customers "a" and suppliers "b" and "c", which are connected by communication means such as telephones, computers and networks. These suppliers contain one "b" for requesting the cooperation for reducing the production/supply cost (or the cost reduction) and another "c" for merely supplying a product. On the other hand, the same supplier may request the cooperation for reducing the cooperation for reducing the production/supply cost (or the cost reduction) and supply the product to the customer "a". The production/supply activities according to the embodiment of the present invention are made premising the purchasing activities that a customer offers a cooperation for reducing the production/supply cost (or the cost reduction) of a supplier on the basis of the information on the cooperation request of the supplier for the customer, as acquired through the media such as magazines, newspapers, direct mails or internet for reducing the production/supply cost (or the cost reduction), and that the supplier examines and accepts the offer so that, at the time of the consuming activities of the customer to be made with the return of a portion or all of the fruits (as will be called the return benefits) of the reduction (or the cost reduction) of the production/supply cost, the customer can utilize the return benefits acquired not only from the partner, from whom the customer purchases the product, but also from a plurality of other suppliers.

Figure 2:
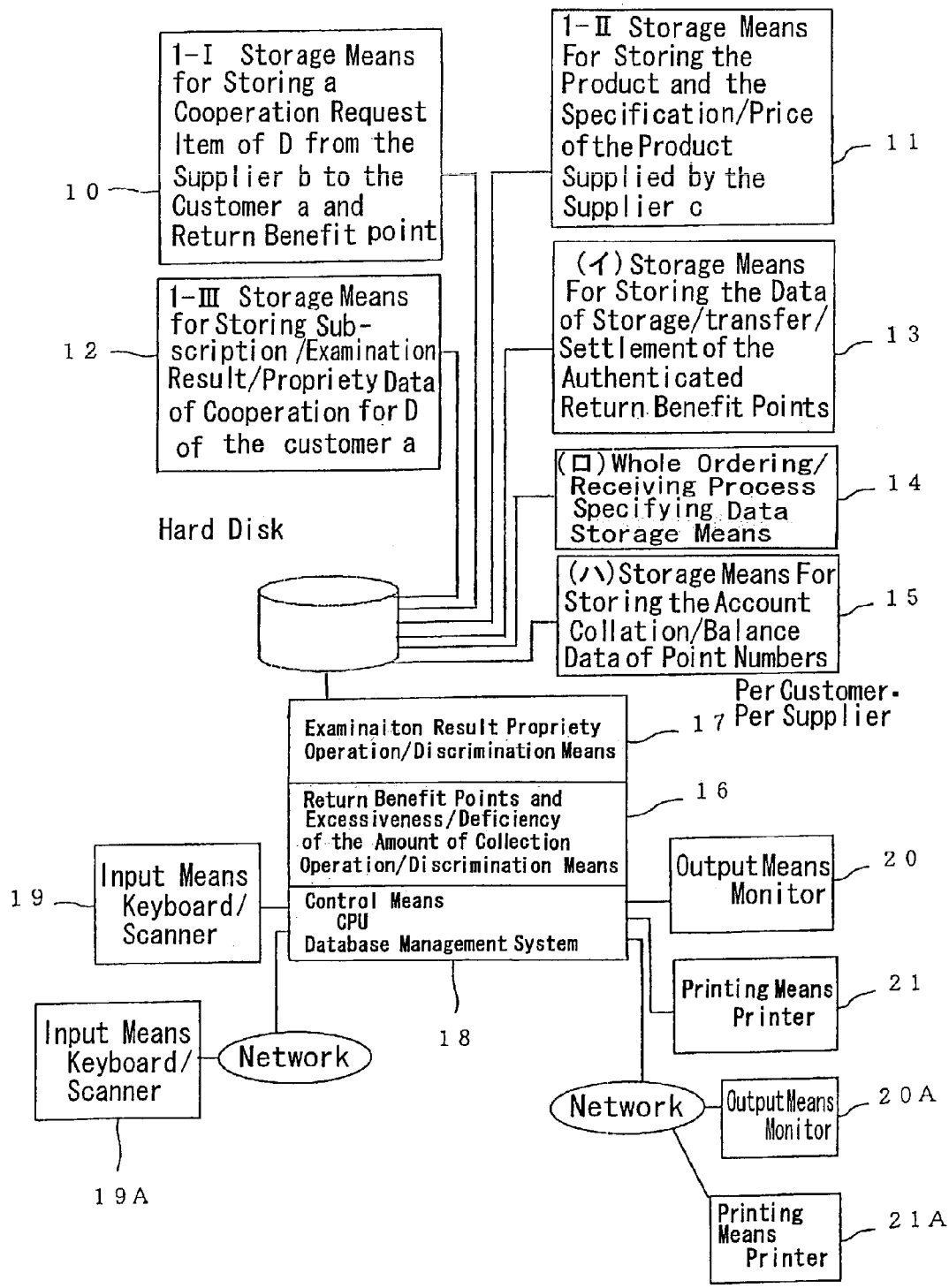
FIG. 2 is a schematic diagram showing a construction of the customer-participating type production/supply system operating apparatus according to the present invention.

FIG. 2 presents a construction example showing the customer-participating type production/supply system operating apparatus. The present apparatus is provided with: 1-I cooperation request item/return benefit point information storing means 10 for storing the information (as referred to FIG. 4) on the items for the cooperation request for reducing the production/supply cost (or the cost reduction) from a supplier to a customer and the return benefit points; 1-II means 11 for storing the information (as referred to FIG. 5) on the supply product of the supplier; 1-III subscription/examination result/propriety data storing means 12 for storing the subscription data of the customer for the cost reduction, the examination data and the propriety result data; means 13 for storing the storage/transfer/settlement data (as referred to FIG. 7) of the return benefit points authenticated; control means and operation means therefore; whole ordering/receiving process specifying data (as referred to FIG. 8) storing means 14; account collation/balance data storing means 15 for storing data (as referred to FIG. 9) on the account collation and the balance of the return benefit point number; and operation means 16, discrimination means 17, control means 18, input means 19, output means 20 and printing means 21 therefore. In the embodiment of the present invention, these means cover the entirety of the hardware of a server, which is connected through the communication means such as the computer networks and which is provided with input means 19A such as a keyboard or a scanner, output means 20A such as a monitor and printing means 21A such as a printer, and the software to act over the server.

In the server, there are registered the basic data such as the cooperation request items of the supplier and the corresponding return benefit points. Each supplier evaluates and calculates the reduction (or the cost reduction) effect, as occurs when the customer cooperates each cooperation request item, of the production/supply cost, defines in advance what point is returned to the customer, and provides it as the data for the examination item. The information on the aforementioned 1-I and 1-II necessary for judging whether or not the customer subscribes is opened to the public through the media such as the news papers, the magazines or the networks. Moreover, the server is provided with: means for storing the examination item data and the examination standard data (as referred to FIG. 6) when the customer subscribes; the discrimination means 17 for discriminating the propriety of the examination result by using the customer information corresponding those data; and the operation means 16 for calculating the return benefit points. In the server, too, there are registered the basic data such as the products supplied by the supplier or the prices. This information is opened to the public through the media such as the news papers, the magazines or the networks. On the other hand, the aforementioned whole ordering/receiving process specifying data storing means 14 is equipped with cash/point converting means capable of converting the points owned by the supplier or the customer and the cash into each other on the basis of a predetermined cashing rate such as 1 yen for 1 point or 2 yens for 1 point or 1 yen for 2 points. By this cash/point converting means, the supplier is enabled to settle the balance with the points at the center, if he desires so. Here, this cash can contain the electronic money, as used in the internet business transactions, in addition to the real money. Moreover, the deficient cash can be settled with the credit cards.

The information on the cooperation request items for the reduction (or the cost reduction) of the production/supply cost from the 1-I supplier to the customer and of the return benefit points is stored as information of the cooperation requester codes, the supplier names, the item codes, the item names, the return benefit point number and so on, as shown in FIG. 4. As the item names at this time, there are enumerated: the cooperation of the cost reduction by an advance order of regular purchases to improve the precision of the production schedule on the supplier side, its period difference, the cost reduction by the cooperation for recycles, the cooperation to reduce packages and distribution costs by the sales by measure, the cooperation to reduce the cost for money collections by the automatic transfers, the cooperation to improve the marketing precision and to reduce the advertising cost by the card members, and the items of life members/yearly members/definite orders/advance orders. Specifically: the cooperation requesting supplier code is b-0004; the supplier name is Net Bank; the item code is b-0004-0001; the item name is the card member; and the return benefit point number is 8,000.

For the supplied product information of the 1-II supplier, as shown in FIG. 5, the supplier code, the supplier name, the product code, the product name, the specifications, the price, the point number matching, the price and so on are stored as the information. Specifically, the point number is 200,000, in case: the supplier code is c-0001; the supplier name is Nishishiba; the product code is c-0001-03; the product name is Note Personal Computer; the specifications are Dynabook; the price is ¥200,000; and 1 point is 1 yen.

For the examination standard data for the subscription to the cooperation request, as shown in FIG. 6, the cooperation requesting supplier code, the cooperation requesting supplier name, the cooperation request item code, the cooperation request item name, the return benefit point, the question item, the return benefit point giving standards and so on are stored as the information. As the specific question items, there are enumerated several items such as "Do you have a schedule to build a house newly or reform it within ten years?", "Are you under or over twenty years?", or "What cooperation can you give when your house is reformed?", on which individual alternatives are set. Moreover, the return benefit point giving standards are to return 10,000 points to the customer, for example, in case the answers are: the alternative of the question item 1 was "a"; also, the alternative of the question item 2 was other than "a"; moreover, the alternative of the question item 3 was "a"; and furthermore, the alternative of the question item 4 was "a". Thus, the points are added according to the selections of the question items and their alternatives.

The subscription/authentication/transfer/settlement process data for the reduction (or the cost reduction) of the production/supply cost are the subscription date, the customer code, the customer name, the cooperation requesting supplier code, the cooperation requesting supplier name, the item code, the item name, the return point number, the notice date, the authentication date, the authentication code, the transfer date, the transfer code, the settlement date, the settlement code and so on are stored as the information, as shown in FIG. 7. Specifically: the subscription date is April 25, Heisei 12; the customer code is a-0005; the customer name is Taro Sasaki; the cooperation requester code is b-0004; the cooperation requester name is Net Bank; the item code is b-0004-002; the item name is the card member; the return point number is 30,000; the notice date is April 25, Heisei 12; the authentication date is May 10, Heisei 12; the authentication code is ab-0005-0004-0001; the transfer date is May 15, Heisei 12; the transfer code is ab-0004-001; the settlement date is May 20, Heisei 12; and the settlement code is abc-0004-001. Here, the present data are either inputted on the basis of the subscription reception at the center from the customer to the cooperation requesting supplier or subscribed through the networks by the customer inputting themselves to the host computer of the center.

For the whole ordering receiving process specifying data, as shown in FIG. 8, the ordering/receiving code, the reception date, the customer code, the customer name, the supplier code, the supplier name, the product code, the product name, the number of receptions, the supply sum, the authentication code, the transfer point number, the transfer date, the transfer code, the balance, the collection date (or the dispatch designating date), the dispatch propriety, the dispatch date (or the settlement date), the settlement code and so on are stored as the information. Specifically; the ordering/receiving code is J a-0005-001; the reception date is May 15, Heisei 12; the customer code is a-0005; the customer name is Taro Sasaki; the supplier code is c-0001; the supplier name is Nishishiba; the product code is c-0001-03; the product name is Note Personal Computer; the number of receptions is 1; the supply sum ¥200,000; the authentication code is ab-0005-0002-0001; the transfer point number is 30,000; the same is ab-0005-0004-0001; the transfer point number is 30,000; the transfer date is May 15, Heisei 12; the transfer code is ab-0002-001/ab-0004-001; the balance is ¥-140,000; the collection date (or the dispatch designating date) is May 18 Heisei 12; the dispatch propriety is OK; the dispatch date (or the settlement date) is May 20, Heisei 12; and the settlement code is abc-0002-001/abc-0004-001.

For the settlement collations as the account collations of the return benefit point number and the account data by the operations, as shown in FIG. 9, the settlement code, the settlement point number, the settlement date, the supplier code, the supplier name, the transfer code, the transfer point number, the transfer date, the customer code, the customer name, the authentication code, the authentication point number, the authentication date, the cooperation requesting supplier code, the cooperation requesting supplier name, the sum of settled point number, the authentication point of unsettled balance, the total transferred point number, the transfer point of unsettled balance, the total authentication point number, the authentication point untransferred balance and so on are stored as the information. Specifically: the settlement code is abc-0002-001 and the settlement point number 30,000, or the settlement code is abc-0004-001 and the settlement point number 30,000; the settlement date is May 20, Heisei 12; the supplier code is c-0001; the supplier name is Nishishiba; the transfer code is ab-0002-001 and the transfer point number is 30,000, or the transfer code is ab-0002-001 and the transfer point number is 30,000; the transfer date is May 15, Heisei 12; the customer code is a-0005; the customer name is Taro Sasaki; the authentication code is ab-0005-0002-0001, ab-0006-0003-0001; the authentication point number is 30,000 or 10,000; the authentication date is April 21, Heisei 12; and the cooperation requesting supplier code is b-0002 and the cooperation requesting supplier is Miyauchi Kohmuten, or the cooperation requesting supplier code is b-0003 and the cooperation requesting supplier is Sekiguchi Saketen. On the other hand: the sum of settled point number is 80,000; the authentication point of unsettled balance is 10,000; the total transferred point number is 90,000; the transfer point of unsettled balance is 10,000; the total authentication point number is 90,000; and the authentication point of untransferred balance is 0.

Figure 3:
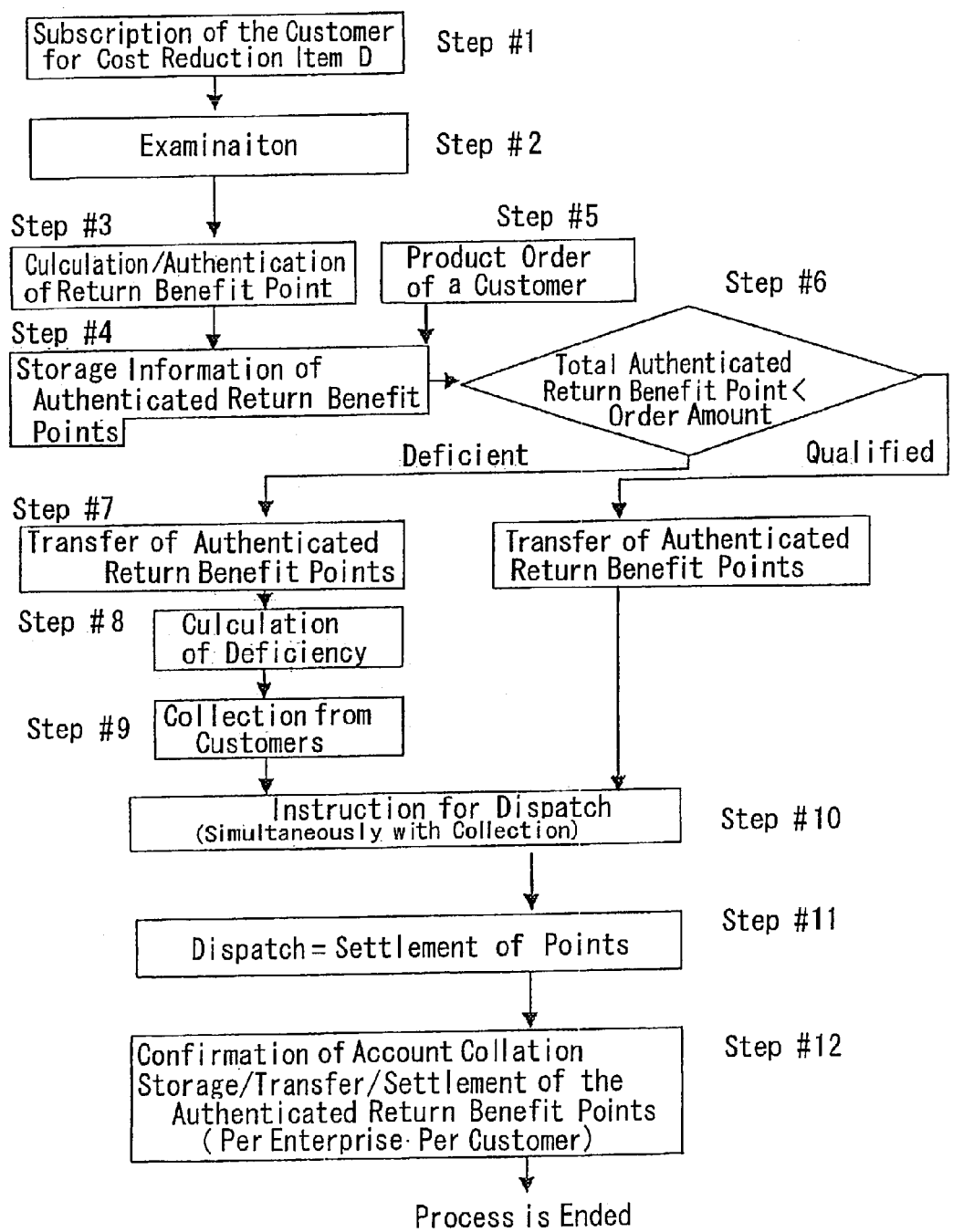
FIG. 3 is a flow chart showing the processing flows starting from the subscription of the customer to cost reduction items in the customer-participating type production/supply system operating apparatus.

The actions of the customer-participating type production/supply system operating apparatus in the embodiment of the present invention will be described in the following with reference to the flow chart shown in FIG. 3. FIG. 3 shows the processing flow starting from the subscription of the customer to the reduction (or the cost reduction) of the production/supply cost. The customer peruses the opened cooperation request items of the supplier, examines the cooperation contents and the return benefit point, and selects and subscribes the item he wants to cooperate (at Step #1). The subscription is desired to be applied through the networks but can be offered to the operation center by the method using telephones, facsimiles or post cards. Alternatively, the subscription can also be applied, if the customer already received the issue of an ID card, by presenting the ID card or causing it to be read by a reading machine. In the application case using the telephone/facsimile/card, the subscription is inputted by the operator of the center. At the first application, the customer registers his fundamental information such as name and address in the server and receives the issue of the customer code at the same time. The customer may also receive the issue of such an ID card at the later date that the customer code is described or recorded. Subsequently after having received the issue of the customer code, the customer transmits the information necessary for the subscription such as the supplier name he is going to subscribe to, or the cooperation request item and causes the operator to input the information, or inputs the information by himself through the networks. This information is stored by the means 12 1-III for storing the subscription to the reduction (or the cost reduction) of the production/supply cost/the examination result/the propriety data.

Over the server, on the basis of the subscription data from the customer and the examination item/the examination standard data of the supplier, the examination is conducted (at Step #2) to discriminate the propriety of the result. On the basis of this result, the point number is calculated to calculate and authenticate the return benefit point to be given to the customer (at Step #3). The information on the authentication is stored by the means 12 1-III for storing the subscription to the reduction (or the cost reduction) of the production/supply cost/the examination result/the propriety data. The return benefit point is given from the cooperation request enterprise to the customer when the customer promises the present and future cooperation with the cooperation request enterprise. The customer can use the return benefit point, which is given by promising the supplier the present and future cooperation, for the present and future products/services provided by the supplier.

The customer is enabled to store the return benefit point (at Step #4) by repeating the process to secure the return benefit point through that subscription/authentication for a plurality of suppliers. The customer is enabled to know the point number he has stored, by being notified of it through the post/telephone/facsimile from the center or by inquiring it directly for the server if the customer is connected with the networks.

The customer can use the stored return benefit point when he orders the product/service to any supplier. The order from the customer to the supplier is made to the server through the networks or the telephone/facsimile (at Step #5). The information such as the supplier, the supplied product and the order number is registered in the server by the whole ordering/receiving process specifying data storing means 14 so that the ordering/receiving code is issued.

The server retrieves the balance of the return benefit points, which have been authenticated till this order date of the customer but undigested, automatically from the 1-III subscription/examination result/propriety data of the production/supply cost, selects the balance in the order of the earlier authentication data till the total point number satisfies the ordering sum (at Step #6), and transfers it to the storage/transfer/settlement of the return benefit points authenticated processing data, so as to secure the payment of the commodity ordered (at Step #7).

The sum calculated by subtracting the sum of the transferred return benefit points from the ordering sum is the collected sum in cash from the customer. The customer can confirm the sum to be paid, either by the notification from the center or directly on the networks (at Step #8). The transfer of the points is made such that the transfer date and the transfer code are automatically registered in the means 13 for storing the storage/transfer/settlement data of the return benefit points authenticated.

When it is confirmed that the collected sum in cash from the customer is 0, the dispatch to the supplier is instructed on the ordering day (at Step #10). In the case of deficient sum (at Step #8), the dispatch is instructed (at Step #10) when the payment is made by the customer (at Step #9) and when the total of the return benefit points and the sum of the payment reach the ordering sum (at Step #6). The dispatch instruction is transmitted from the server to the distribution warehouse of the center or the supplier through the facsimile or electronic mail.

By a method similar to that for the dispatch instruction, a shipping report is delivered from the distribution warehouse of the center or the supplier to the server of the center so that the dispatch date is stored in the (B) whole ordering/receiving process specifying data storing means 14. At this instant, the payment of the commodity shipped occurs to the supplier. The payment from the center to the supplier may be made in the points other than the cash.

On the other hand, the settlement code is issued to the return benefit points transferred and secured for the payment of the ordered product. At this instant, a demand from the center occurs for the supplier having authenticated the points, to which the settlement code has been issued, for the customer (at Step #11). In this case, the supplier can settle with the points, if owned, other than the cash, too.

Finally, the account collations of the storage/transfer/settlement data of the authenticated return benefit points and the balance confirmation are outputted separately of the enterprises/customers (at Step #12), and the process is ended.

DISCLOSURE OF THE INVENTION

According to the present invention, as has been described hereinbefore, on the basis of the information given from the aforementioned numerous suppliers, moreover, the customer selects the product he wants to purchase at present or in the future, or the supplier having the product group in accordance with his own desire, and cooperates for reducing (or the cost reduction) of the production/supply cost of the supplier, so that the merits of both the customer and the supplier can be achieved at the same time by acquiring the merit of the customer himself through the return benefits to come to hand and by contributing to the reduction (or the cost reduction) of the production/supply cost of the supplier on the other hand.

In order not to terminate the relation between the customer and the supplier by one pair but to apply it widely between the numerous customers and the numerous suppliers, moreover, the supplier gives the return benefits positively before the execution of the cooperation, if this cooperation of the customer is promised in the future for reducing (or the cost reduction) of the production/supply cost of the supplier, so that the customer can use the return benefits even in the acquisition of the products of any suppliers so that the range of the exploitation of the return benefits can be widened to stimulate the aggregate demand thereby to lead to the result to the benefits of all the suppliers.

In short, it is possible to provide the customer-participating type production/supply system operating apparatus which is enabled, by causing the sum of the return benefits obtained by the promise of the cooperation with the numerous suppliers to be used for acquiring the product of one supplier, to realize the multiplier effect with expanding the selection of the customer thereby to respond to all participants of both the customers and the suppliers.

By adding the utility of the IT technology to reduce the prices of the whole global society thereby to provide a connection technique capable of adding a new impelling force of the "customer drive" for operating the whole economy efficiently, moreover, the wasteless article production can be developed to make a contribution to the conversion of the whole economic society into the consumption/production activities of the environment preservation type capable of sparing the energy and resources.

In addition, whether or not the return benefit point is to be given in compensation for the reduction of the production/supply cost can be precisely decided at an instant because the subscription authentication information storage means for each customer examines and investigates the cooperation request item demanded by the supplier and the information of the customer accepting the cooperation to reduce the production/supply cost, and decides whether or not the return benefit point in compensation for the reduction of the production/supply cost is to be given by the supplier to the customer.

Moreover, the balance of the points can be precisely grasped/managed because the point receiving/paying balance information storage means for each customer records the receiving/paying balance of the points when the supplier gives the return benefit point in compensation for the reduction of the production/supply cost to the customer.

On the other hand, the flow of cash can be precisely grasped/managed in relation to the order reception/dispatch of the products and the point balance because the collection/payment information storage means investigates the commodity ordering information for each customer, the reception/dispatch/sales information for each supplier, the payment information for each customer and the point receiving paying balance information for each customer, and records the process of the investigations.

Moreover, the contents of the reduction of the production/supply cost can be sufficiently understood by the customer to invite the cooperative customers widely because the supplier requesting the reduction of the production/supply cost/the cooperation request item demanded by the supplier and so on are notified through media such as the magazines, the newspapers, the direct mails or the internet.

Moreover, the acquired points can be exploited over a wide range because there are a plurality of suppliers for returning the return benefit points in compensation of the reduction of the production/supply cost to the customer.

Moreover, the economic revitalization of the whole market can be realized because the customer can use the return benefit points in compensation for the reduction of the production/supply cost of a specific supplier, in another supplier. Moreover, it is possible to judge precisely whether or not the return benefit point is to be given, because the cooperation request item requested by the supplier includes the examination item for giving the return benefit point in compensation for the reduction of the production/supply cost.

In addition, the will of the customer can be precisely reflected on the product provided by the supplier, because all the data of the customer himself are opened, if desired, by the customer and are used on the supplier side by retrieving them arbitrarily.

Moreover, the customer can also exploit the information of the supplier effectively, because all the data of the customer himself are opened, if desired, by the customer and all the data of the business kind, the product group and the cooperative conduct of the supplier are opened by the supplier wanting to cooperate, so that those data are used on the customer side and the supplier side by retrieving them arbitrarily.

Moreover, it is possible to judge from multiple faces whether or not the return benefit point in compensation for the reduction of the production/supply cost is to be given, because the data on the customer side are referred to when it is examined whether or not the return benefit point is to be given in compensation for the reduction of the production/supply cost.

Moreover, the points can be cashed and can be exploited as cash, because the customer can receive cash if the points owned by him are multiplied by a constant according to a predetermined constant rate.

The invention claimed is:

1. A computer apparatus for operating a production or supply system in which customers can participate, the computer apparatus comprising:

a first storage unit storing data relating to a cooperation request item for a supplier and return benefit points associated with the cooperation request item;

a second storage unit storing (i) data relating to specifications and the price of a product supplied by the supplier, as data associated with the supplier and (ii) one or more question items relating the product and/or customer, as data associated with an examination standard;

a third storage unit storing subscription data input by a customer to the computer apparatus when the cooperation request item is subscribed to by the customer, as data associated with a customer code of the customer;

a fourth storage unit storing the return benefit points determined according to the subscription data stored by the third storage unit, as data associated with the customer code;

a fifth storage unit storing (i) order data placed by the customer when the product supplied by the supplier is purchased by the customer, and (ii) answer(s) to question items input by the customer to the computer apparatus when the customer subscribes to the cooperation request item;

a sixth storage unit storing balance data of the return benefit points for each customer code and being able to be used by the each customer;

a first processor executing a software program stored in computer memory for (i) checking the subscription data stored in the third storage unit when the cooperation request item is subscribed to by the customer and determining if the subscription data meets the supplier's requirements, and (ii) determining whether or not the answer(s) input by the customer to the question item(s) stored in the fifth storage unit should, result in return benefit points being awarded to the customer's balance by determining a cost reduction with reference to the examination standard data stored in the second storage unit, the cost reduction being a reduction in all production/supply costs including a production cost, a purchasing cost, a general management cost, and an estimated cost in the production/supply system of the supplier achieved by mutual cooperation between the supplier and the customer to reduce the price of the product, lower than a conventional price;

a second processor executing a software program stored in computer memory for calculating a number of return benefit points to be added to the customer's balance data based on the determination of the first processor and to authenticate the return benefit points to be added to the customer's balance, and retrieving and determining the return benefit points stored in the first storage unit according to the order data placed by the customer determined to meet the supplier's requirements and the data relating to the product stored in the second storage unit, and adding the determined return benefit points to the balance data of the customer code of the customer placing the order data or subtracting the determined return benefit points from the balance data of the customer code of the customer placing the order data; and a controller for controlling the first to sixth storage units, the first processor, and the second processor.

2. A computer apparatus according to claim 1, further comprising:

at least one of a computer terminal for inputting a storage data from the supplier on a supplier side and a computer terminal for inputting a storage data from the customer on a customer side, connected to the apparatus.

3. An apparatus according to claim 1 or 2, wherein, if a command to use the return benefit points which the customer has owned is included in the order data placed by the customer, the second processor applies the balance of the return benefit points indicated in the balance data stored by the sixth storage unit to lower the price of the product whose data is stored by the second storage unit.

4. An apparatus according to claim 1 or 2, wherein there are a plurality of suppliers that can provide return benefit points to the customer.

5. An apparatus according to claim 3, wherein there are a plurality of suppliers that can provide return benefit points to the customer.

6. An apparatus according to claim 4, wherein the customer's return benefit points can be used for another supplier different from the supplier which provided the return benefit points to the customer.

7. An apparatus according to claim 5, wherein the customer's return benefit points can be used for another supplier different from the supplier which provided the return benefit points to the customer.

8. An apparatus according to claim 1 or 2, wherein the cooperation request item includes an examination item for giving return benefit points predetermined by the supplier.

9. An apparatus according to claim 3, wherein the cooperation request item includes an examination item for giving return benefit points predetermined by the supplier.

10. An apparatus according to claim 4, wherein the cooperation request item includes an examination item for giving return benefit points predetermined by the supplier.

11. An apparatus according to claim 5, wherein the cooperation request item includes an examination item for giving return benefit points predetermined by the supplier.

12. An apparatus according to claim 6, wherein the cooperation request item includes an examination item for giving return benefit points predetermined by the supplier.

13. An apparatus according to claim 7, wherein the cooperation request item includes an examination item for giving return benefit points predetermined by the supplier.

14. An apparatus according to claim 8, wherein the examination item includes storage data provided by the customer.

15. An apparatus according to claim 9, wherein the examination item includes storage data provided by the customer.

16. An apparatus according to claim 10, wherein the examination item includes, storage data provided by the customer.

17. An apparatus according to claim 11, wherein the examination item includes storage data provided by the customer.

18. An apparatus according to claim 12, wherein the examination item includes storage data provided by the customer.

19. An apparatus according to claim 13, wherein the examination item includes storage data provided by the customer.

20. An apparatus according to claim 1 or 2, wherein return benefit points are awarded by the second processor to the balance data of the customer stored on the sixth storage unit after the first processor determines the cost reduction achieved by the cooperation request item subscribed by the customer of an advance order of regular purchases to improve precision of production schedule on supplier side.

21. An apparatus according to claim 1 or 2, wherein return benefit points are awarded by the second processor to the balance data of the customer stored on the sixth storage unit after the first processor determines the cost reduction achieved by the cooperation request item subscribed by the customer for recycling.

22. An apparatus according to claim 1 or 2, wherein return benefit points are awarded by the second processor to the balance data of the customer stored on the sixth storage unit after the first processor determines the cost reduction achieved by the cooperation request item subscribed by the customer to reduce package and distribution costs.

23. An apparatus according to claim 1 or 2, wherein return benefit points are awarded by the second processor to the balance data of the customer stored on the sixth storage unit after the first processor determines the cost reduction achieved by the cooperation request item subscribed by the customer to reduce cost for money collections by automatic transfers.

24. An apparatus according to claim 1 or 2, wherein return benefit points are awarded by the second processor to the balance data of the customer stored on the sixth storage unit after the first processor determines the cost reduction achieved by the cooperation request item subscribed by the customer to improve marketing precision and to reduce advertising cost by card members.

25. An apparatus according to claim 1 or 2, wherein return benefit points are awarded by the second processor to the balance data of the customer stored on the sixth storage unit after the first processor determines the cost reduction achieved by the cooperation request item subscribed by the customer relating to items of lifetime and annual memberships, and confirmed and advance orders.

26. An apparatus according to claim 1 or 2, wherein return benefit points are awarded based on a percentage of the cost reduction.

* * * * *